March 1, 1932.  F. HODGKINSON  1,847,611

REDUCTION GEAR

Filed May 26, 1930

WITNESS

INVENTOR
Francis Hodgkinson.
BY
ATTORNEY

Patented Mar. 1, 1932

1,847,611

UNITED STATES PATENT OFFICE

FRANCIS HODGKINSON, OF PHILADELPHIA, PENNSYLVANIA, ASSIGNOR TO WESTINGHOUSE ELECTRIC & MANUFACTURING COMPANY, A CORPORATION OF PENNSYLVANIA

REDUCTION GEAR

Application filed May 26, 1930. Serial No. 455,853.

My invention relates to power-transmission gearing and it has for an object to provide durable apparatus of this character capable of transmitting large loads and of accommodating the gear elements relatively to each other to maintain proper tooth engagement.

It is well-known that gears having an enveloping form of teeth, such as cycloidal, are capable of operating with much higher tooth loads than gears having teeth of involute form because the curvature of the contours of the teeth in the former case more nearly correspond to each other and the line of contact is a broader one. Furthermore, with the first-mentioned type of gear, the form of tooth is stronger with the result that there is less deflection of the teeth under load. In general, I prefer to use the cycloidal form of tooth, and the pitch line may be placed in any relation with respect to the tooth, that is, the teeth may be partially addendum and dedendum or wholly addendum. An objection to the use of the enveloping or cycloidal form of tooth in large gears is that, for proper operation, the teeth must remain at all times in a definite depth of engagement. It is difficult to secure proper engagement, particularly with large gears, because, with different expansions, due to heat, of the gears and of the supporting structures, it is impossible to maintain proper tooth engagement at all times when the supports for the gears are rigid with the supporting construction or frame. Accordingly, therefore, it is a more particular object of my invention to provide means for automatically varying the centers between gear and pinion members so that the depth of intermeshing of the teeth will be the predetermined amount regardless of varying temperatures and expansion of the gear and pinion members and the supporting structure therefor; and, while means of this character is particularly suitable to maintain gear elements of the cycloidal form in proper meshing relation, it is to be understood that the present invention is not limited to any particular tooth form.

These and other objects are effected by my invention, as will be apparent from the following description and claims taken in connection with the accompanying drawings, forming a part of this application, in which:

Figure 4:
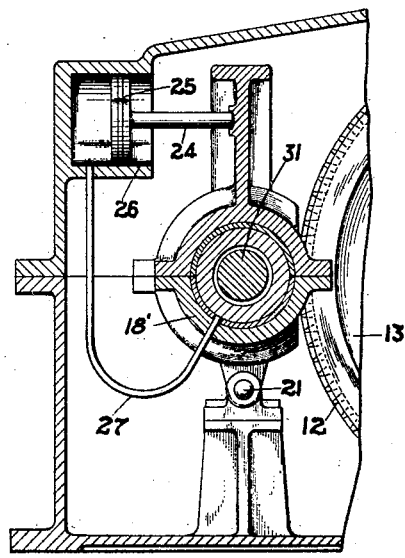

Referring now to the drawings more in detail, I show a pinion 10 having teeth 11 meshing with teeth 12 on the gear 13. The meshing teeth are preferably of the cycloidal or enveloping form (Fig. 4) to provide for stronger teeth and therefore stronger gears.

As cycloidal gears should have predetermined relative positions to secure proper meshing relation, that is, the pitch circles should be tangent, I provide the pinion 10 with shrouds or tires 15 which engage with shrouds or tires 16 of the gear 13 to limit the depth of engagement of the teeth 11 relatively to the teeth 12. The pinion 10 and the gear 12 are carried by a suitable frame or casing 17.

Figure 1:
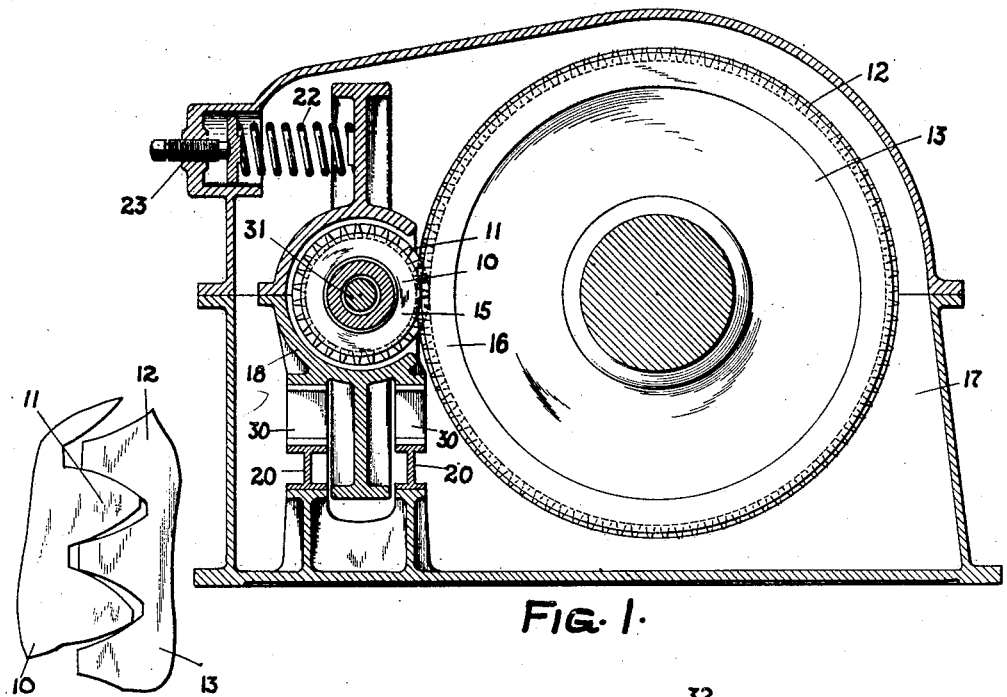
Fig. 1 is a transverse sectional view of gearing having my invention applied thereto.
Figures 2, 3:
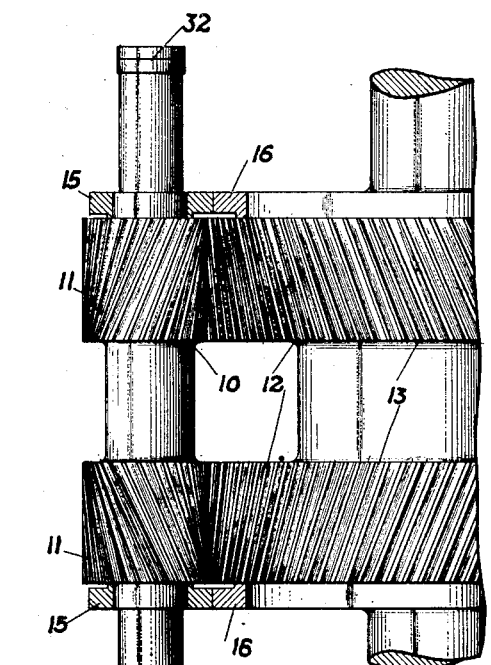
Fig. 2 is a detail view showing meshing gear elements.
Fig. 3 is a view, similar to Fig. 1, but showing an alternative embodiment of my invention; and, Fig. 4 is a detail view showing an example of enveloping cycloidal teeth.

In order to maintain proper depth of engagement of the pinion and gear teeth with the tires or shrouds in rolling contact and with expansion and contraction of the pinion and gear members, the supporting structure for the pinion and gear members is arranged to provide for movement of the pinion inwardly or outwardly with respect to the axis of the gear. To this end, I show the pinion 10 carried by a suitable frame 18 capable of such movement. In Fig. 1, the frame 18 is supported by I-beam supports 20, 20 to permit of this movement. In Fig. 3, the frame 18' is supported by a pivot 21 which provides for similar movement.

With a frame having supporting means associated with the lower side thereof, as in Figs. 1 and 3, and permitting of inward or outward movement of the frame to take care of expansion and contraction effects of the gear members, it is necessary to provide yieldable means cooperating with the frame to urge the latter toward the axis of the gear so as to maintain proper meshing relation of the pinion and gear tooth portions 11 and 12 and rolling engagement of the tires or shroud rings 15 and 16, it being necessary that the yielding means shall exert a force maintaining the teeth in mesh greater than the force tending to separate the teeth due to the obliquity of the latter. In Fig. 1, I show a spring 22 contacting with the upper side of the frame and whose compression may be adjusted by the screw 23 so that the required force may be exerted on the frame to secure proper meshing relation of the pinion and gear teeth.

Instead of a spring, I may employ a pressure-responsive piston to provide the force to maintain proper meshing relation with the shroud rings or tires in rolling contact, the fluid therefor being either liquid or gaseous and supplied from any suitable source. In Fig. 3, the pinion frame 18' is pivoted at its lower side at 21 and the upper part of the frame contacts with a piston rod 24 connected to a piston 25 arranged in the cylinder 26. Means is provided for supplying fluid under pressure to the cylinder to automatically maintain the pressure therein approximately proportional to the load. In Fig. 3, this is accomplished by having a passage 27 connected to the cylinder and to the film pressure zone of one or more of the pinion bearings, it being understood that the lubricating oil film pressure in the bearings is proportional to the reaction on the bearings and to the tooth pressure. Hence, with the form shown in Fig. 3, variable force is exerted to maintain the pinion in proper meshing relation with the gear. At light loads, when the force tending to spread the pinion and the gear about is not so great, the pressure exerted on the piston 25 is correspondingly reduced. On the other hand, if the load increases, the force tending to separate the pinion and gear also increases but the latter force is counteracted by the increasing fluid pressure force exerted on the piston 25.

If desired, means may be incorporated to provide a floating frame for the pinion 10. In Fig. 1, I show flexible support or I-beam elements 30, 30 capable of providing for tilting about an axis transverse to the pinion axis. Also, I prefer to use a flexible quill drive for the pinion 10, the latter being made hollow and having the shaft 31 extending therethrough and coupled thereto at 32.

From the foregoing, it will be apparent that I have devised a pinion support which is capable of movement to maintain proper meshing relation of a meshing pinion and gear. The pinion support is movable to maintain a uniform depth of engagement of the teeth with expansion and contraction of the pinion and gear members, shroud rings or tires preferably being employed to limit the depth of engagement and yielding means cooperating with the pinion support to assure maintenance of proper meshing relation with the shroud rings or tires in rolling contact.

While I have shown my invention in two forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In combination, in power-transmission gearing, a frame, a gear carried by said frame, a pinion meshing with the gear, a frame for the pinion, means providing for movement of the frame so that the pinion may move toward or away from the gear axis, a piston for exerting force on the frame tending to move the pinion toward the gear member axis, and means for supplying fluid under pressure to act on said piston.

2. In combination, in power-transmission bearing, a supporting frame, a gear carried by said frame, a pinion meshing with said gear, a frame for said pinion, contacting shroud rings carried by the pinion and the gear for limiting the depth of engagement of the teeth, means carried by the supporting frame and cooperating with the pinion frame to provide for movement of the latter toward and away from the axis of the gear, a piston for applying force to the pinion frame tending to move the pinion toward the gear, a cylinder for the piston and carried by said supporting frame, and means for supplying lubricant under pressure to said cylinder to exert pressure on the piston.

3. In combination, in power-transmission gearing, a supporting frame, a gear carried by said frame, a pinion meshing with the gear, shroud rings carried by the pinion and gear for limiting the depth of engagement of the teeth, a frame for the pinion, means providing for movement of the frame so that the pinion may move toward or away from the gear axis, pressure-responsive means for exerting force on said frame tending to move the pinion toward the gear, and means for supplying lubricant from the film pressure zone of the pinion bearing to said pressure-responsive means.

4. In reduction gearing, a driven gear, a pinion meshing with the driven gear, shroud rings carried by the gear and by the pinion for limiting the depth of meshing engagement, a casing enclosing the driven gear and the pinion and supporting the driven gear, a frame supporting the pinion, a floating frame connection between the lower portion of the frame and the casing, and yieldable means effective between the casing and the upper portion of the frame above the pinion for maintaining the depth of meshing engagement of the gear and pinion, whereby the gear and the pinion are maintained in proper meshing relation irrespective of expansion and contraction effects.

5. In reduction gearing, a driven gear, a pinion meshing with the driven gear, shroud rings carried by the gear and by the pinion for limiting the depth of meshing engagement, a casing enclosing the driven gear and the pinion and supporting the driven gear, a frame supporting the pinion, a floating frame connection between the lower portion of the frame and the casing, yieldable means interposed between the casing and the upper portion of the frame above the pinion for maintaining the depth of engagement of the pinion and the driven gear, and means providing for variation of the force exerted by said yieldable means.

6. In reduction gearing, a driven gear, a pinion meshing with the driven gear, shroud rings carried by the gear and by the pinion for limiting the depth of meshing engagement, a casing enclosing the driven gear and the pinion and supporting the driven gear, a frame supporting the pinion, a floating frame connection between the lower portion of the frame and the casing, a spring interposed between the casing and the upper portion of the frame above the pinion for maintaining the depth of engagement of the pinion with the driven gear, and means for adjusting the compression of said spring.

7. In reduction gearing, a driven gear, a pinion meshing with the driven gear, the meshing teeth of the gear and of the pinion being of the enveloping type, shroud rings carried by the gear and by the pinion for limiting the depth of meshing engagement, a casing enclosing the driven gear and the pinion and supporting the driven gear, a frame supporting the pinion, a floating frame connection between the lower portion of the frame and the casing, and yielding means effective between the casing and the upper portion of the frame above the pinion for maintaining the depth of engagement of the pinion and gear, whereby the pinion and gear are maintained in proper meshing relation irrespective of expansion and contraction effects.

In testimony whereof, I have hereunto subscribed my name this 23rd day of May, 1930.

FRANCIS HODGKINSON.